United States Patent [19]
Abe et al.

[11] Patent Number: 6,086,622
[45] Date of Patent: Jul. 11, 2000

[54] METHOD AND APPARATUS FOR CONVERTING AN ARCHITECTURE OF A PROGRAM AND METHOD, AND APPARATUS FOR DEBUGGING A PROGRAM BY USING THEM

[75] Inventors: Yayoi Abe; Shinichiro Suzuki, both of Tokyo; Yoichiro Takeuchi, Urawa, all of Japan

[73] Assignee: Kabushiki Kaisha Toshiba, Kawasaki, Japan

[21] Appl. No.: 08/233,387

[22] Filed: Apr. 26, 1994

[30] Foreign Application Priority Data

Apr. 27, 1993 [JP] Japan ................................. 5-100964

[51] Int. Cl.[7] ........................................... G06F 9/45
[52] U.S. Cl. .................... 703/26; 703/27; 395/704; 395/707; 395/709
[58] Field of Search ........................ 395/500, 800, 395/650, 425, 704, 707, 709; 364/200; 703/26, 27

[56] References Cited

U.S. PATENT DOCUMENTS

| | | | |
|---|---|---|---|
| 4,992,934 | 2/1991 | Portanova et al. ................. | 364/200 |
| 5,133,072 | 7/1992 | Burbee ............................... | 395/700 |
| 5,197,138 | 3/1993 | Hobbs et al. ...................... | 395/375 |
| 5,257,369 | 10/1993 | Skeen et al. ...................... | 395/650 |
| 5,307,504 | 4/1994 | Robinson et al. ................. | 395/800 |
| 5,339,422 | 8/1994 | Brender et al. ................... | 395/700 |

OTHER PUBLICATIONS

*BYTE Magazine*, PowerPC Performs for Less, Aug. 1993, pp. 56–59, 62, 64, 66, 70, 72 and 74.

*Primary Examiner*—Kevin J. Teska
*Assistant Examiner*—Thai Phan
*Attorney, Agent, or Firm*—Oblon, Spivak, McClelland, Maier & Neustadt, P.C.

[57] ABSTRACT

A first high-level language source program for a computer of a first architecture is compiled, thereby producing a machine program for a computer of a second architecture. The machine program is decompiled, thereby producing a second high-level language source program which does not depend on any architecture. The second high-level language source program is compiled and linked, thereby producing a first executable load module. Thus, the architecture of the program is converted, and the operation of the machine program is debugged by executing the first executable load module.

18 Claims, 5 Drawing Sheets

METHOD AND APPARATUS FOR CONVERTING AN ARCHITECTURE OF A PROGRAM AND METHOD, AND APPARATUS FOR DEBUGGING A PROGRAM BY USING THEM

BACKGROUND OF THE INVENTION

1. Field of the Invention

The present invention relates to a method and an apparatus for converting a program for a computer of a first architecture to a machine program adapted for a computer of a second architecture, and to a method and an apparatus for debugging a machine program produced by the above method and apparatus.

2. Description of the Related Art

When a computer of a new architecture which is different from a present architecture is developed, it is necessary to debug a machine program for the computer. However, in general, when the machine program for the new computer is to be debugged, a new computer (hardware) is not completely produced, i.e., does not actually exist. Therefore, it is impossible to actually debug the machine program on the new computer.

Conventionally, to debug a machine program adapted for a computer of a new architecture, a simulator for simulating a hardware function of the new computer in a software process is used. However, since a simulator for simulating a conventional architecture cannot be used for this purpose, the conventional simulator must be reformed or a new simulator suitable for the new architecture must be developed.

In general, debugging of a machine program by using a simulator is achieved as follows: instruction codes of the machine program are serially fetched and decoded by software processes, and the machine program is debugged by simulating operations in accordance with the instruction codes.

As described above, according to conventional art, when a machine program for a computer of a new architecture is debugged by a simulator, the simulator must be modified for the purpose of the debugging. Reform of a simulator or development of a new simulator requires a considerable period of time. Particularly when a plurality of new architectures are developed and it is necessary to select one architecture to be actually used, simulators corresponding to the respective architectures must be prepared.

In debugging of a machine program using a simulator, since instruction codes are serially fetch and decoded by software processes, execution of simulation is very time-consuming.

SUMMARY OF THE INVENTION

An object of the present invention is to provide a method and an apparatus for converting a program for a computer of a first architecture to a machine program for a computer of a second architecture, and a method and an apparatus for easily debugging a converted program for the second architecture computer.

More specific objects of the present invention are:

(1) to easily convert a program for a computer of a first architecture to a program for a computer of a second architecture;

(2) to debug an operation of a machine program for the computer of the second architecture by means of a existing computer, without using a simulator; and (3) to debug an operation of a machine program for the computer of the second architecture with a simulator.

According to an aspect of the present invention, there is provided a converting method for converting an architecture of a program, comprising: a first step of compiling a first high-level language source program for a computer of a first architecture, thereby producing a machine program for a computer of a second architecture; a second step of decompiling the machine program, thereby producing a second high-level language source program which does not depend on any architecture; and a third step of compiling and linking the second high-level language source program, thereby producing a first executable load module.

A debugging method for debugging the machine program comprises a fourth step of executing the first executable load module.

The debugging method may further comprises: a fifth step of compiling and linking the first high-level language source program, thereby producing a second executable load module for the computer of the first architecture; a sixth step of executing the second executable load module with the computer of the first architecture; and a seventh step of comparing a result of executing the first executable load module in the fourth step with a result of executing the second executable load module in the sixth step.

The third step may include a step of compiling and linking the second high-level language source program, thereby producing a first executable load module for the computer of the first architecture, or a step of compiling and linking the second high-level language source program, thereby producing a first executable load module for the computer of the second architecture.

According to another aspect of the present invention, there is provided converting apparatus for converting an architecture of a program, comprising: a machine program producing means for compiling a first high-level language source program for a computer of a first architecture, thereby producing a machine program for a computer of a second architecture; a second high-level language source program producing means for decompiling the machine program, thereby producing a second high-level language source program which does not depend on any architecture; and a first executable load module producing means for compiling and linking the second high-level language source program, thereby producing a first executable load module.

A debugging apparatus for debugging the machine program further comprises a first load module executing means for executing the first executable load module.

The debugging apparatus further comprises: a second executable load module producing means for compiling and linking the first high-level language source program, thereby producing a second executable load module for the computer of the first architecture; a second executable load module executing means for executing the second executable load module with the computer of the first architecture; and a comparing means for comparing a result of executing the first executable load module by means of the first executable load module executing means with a result of executing the second executable load module by means of the second executable load module executing means.

The first executable load module producing means may include means for compiling and linking the second high-level language source program, thereby producing a first executable load module for the computer of the first architecture, or means for compiling and linking the second high-level language source program, thereby producing a first executable load module for the computer of the second architecture.

With the above structure, the machine program which depends on the computer of the second architecture is converted to a general high-level language source program (which does not depend on any architecture). Then, the high-level language source program is compiled and linked to produce an executable load module for a computer of the first or second architecture. Therefore, programs for computers of different architectures can be produced easily, or a program for a computer of the first architecture can be easily converted to a program for a computer of another (the second) architecture.

Further, during a process of developing a computer of a new architecture (second architecture), if it is necessary to debug a machine program (a first machine program) for the new computer, a high-level language source program which defines the same operation as in the machine program is produced from the machine program itself. Since the high-level language source program does not depend on an architecture, a load module, which can be executed by the computer, can be produced by compiling the source program by means of a compiler adapted for the computer of the existing architecture (the first architecture). Therefore, when the load module is actually executed in the computer, the same operation as in the first machine program is executed, thus debugging the machine-dependent first machine program on the existing computer.

For the same reason, simulation of the first machine program can be executed by means of an existing simulator adapted for the first architecture on the basis of a first machine program, which is produced during the process of producing the executable load module and depends on the second architecture and also on the basis of a second machine program for executing the same operation as in the first machine program. Thus, the debugging of the first machine program can be executed by means of the existing simulator.

As described above, according to the present invention, a high-level language source program, which defines the same operation as in the machine program for a computer of a new architecture, is produced from the machine program itself, and the source program is compiled to produce a load module which can be executed by the computer of the existing architecture, which is different from the new architecture. The load module is executed on the computer of the existing architecture, thereby debugging the machine program at a high speed, even if a computer for the new architecture does not exist.

Further, according to the present invention, simulation can be executed by operating a simulator adapted for the first architecture, based on the machine program which is produced during a process of compiling the high-level language source program produced as described above and depends on the first architecture. Thus, the machine program can be debugged by means of the existing simulator.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENTS

Figure 1:
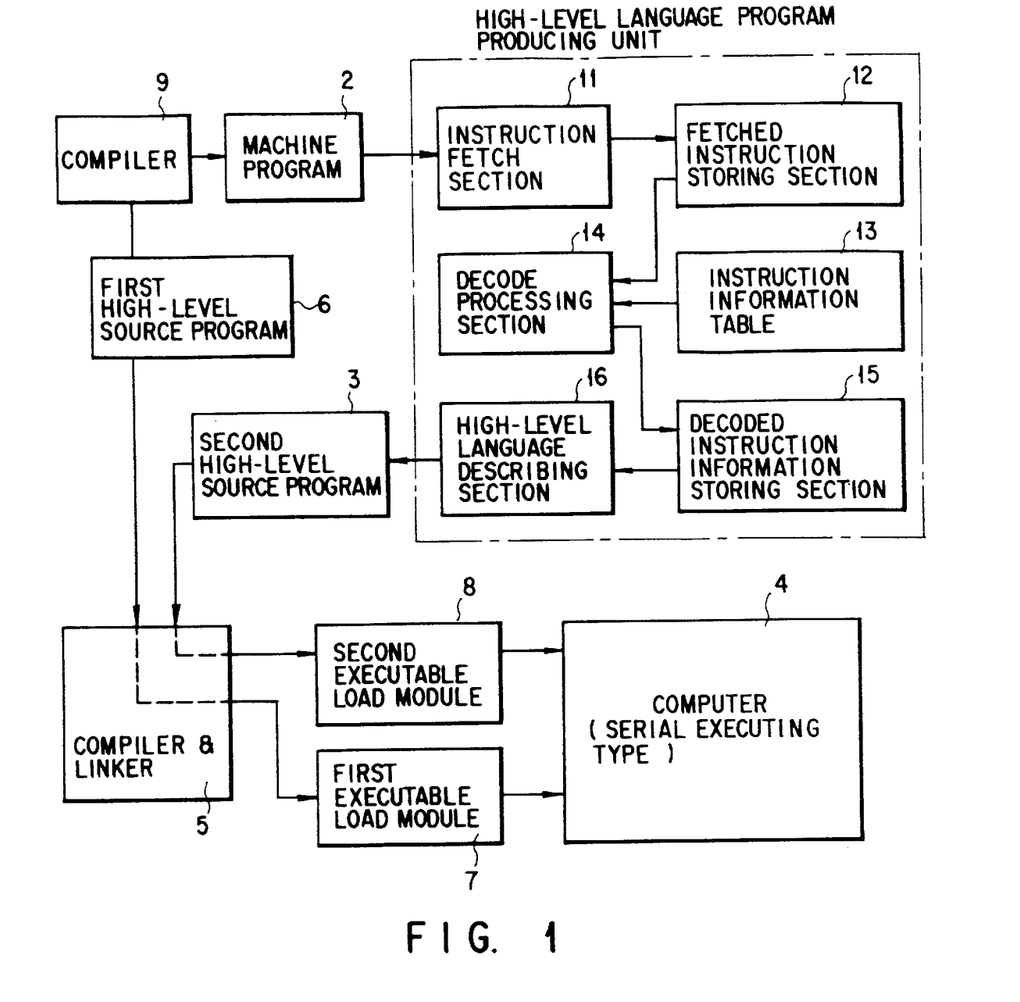
FIG. 1 is a block diagram showing the system of an apparatus for debugging a machine program according to a first embodiment of the present invention.

FIG. 1 is a block diagram showing the system of an apparatus for debugging a machine program according to a first embodiment of the present invention. In the following descriptions, a computer of an existing architecture (hereinafter referred to as a first architecture) is a serial executing type and a computer of a new architecture (hereinafter referred to as a second architecture) is a parallel executing type.

A high-level language program producing unit 1 produces a second high-level language source program 3 written in a language (e.g., C language), which does not depend on an architecture, from a machine program 2 written in a machine language of a computer of a second architecture (hereinafter referred to as a second computer). The second high-level language source program 3 defines the same operation as the machine program 2.

The machine program 2 is a program which has been developed to be adapted for a new serial executing type computer of the second architecture. It can be developed by a expert, or can be prepared by compiling a first high-level language source program 6 for a computer of the first architecture (hereinafter referred to as a first computer) by means of a compiler 9 into a program adapted for the second architecture. The machine program 2 is written in parallel, so that the second computer can execute executable instructions in parallel. In other words, the machine program 2 is a parallel machine program.

The high-level language program producing unit 1 comprises a instruction fetch section 11, a fetched instruction storing section 12, a instruction information table 13, a decode processing section 14, a decoded instruction information storing section 15 and a high-level language describing section 16.

The instruction fetch section 11 fetches a instruction from the machine program 2.

The fetched instruction storing section 12 stores the instruction fetched by the instruction fetch section 11.

The instruction information table 13 has information (instruction information) representing a form of the description (notation) corresponding to every type of instruction.

The decode processing section 14 decodes the instruction stored in the fetched instruction storing section 12 with reference to the instruction information table 13, and generates instruction information of a form which can be processed by the high-level language describing section 16.

The decoded instruction information storing section 15 stores instruction information (decoded instruction information) generated by the decode processing section 14.

The high-level language describing section 16 generates a code (i.e., a second high-level language source program) of a high-level language (e.g., a C language), which defines the same operation as that described in the decoded instruction information stored in the decoded instruction information storing section 15.

A compiler and linker 5 compiles and links the first and second high-level language source programs 6 and 3, and produces first and second executable load modules 7 and 8, which can be executed by the first computer 4.

Figure 2:
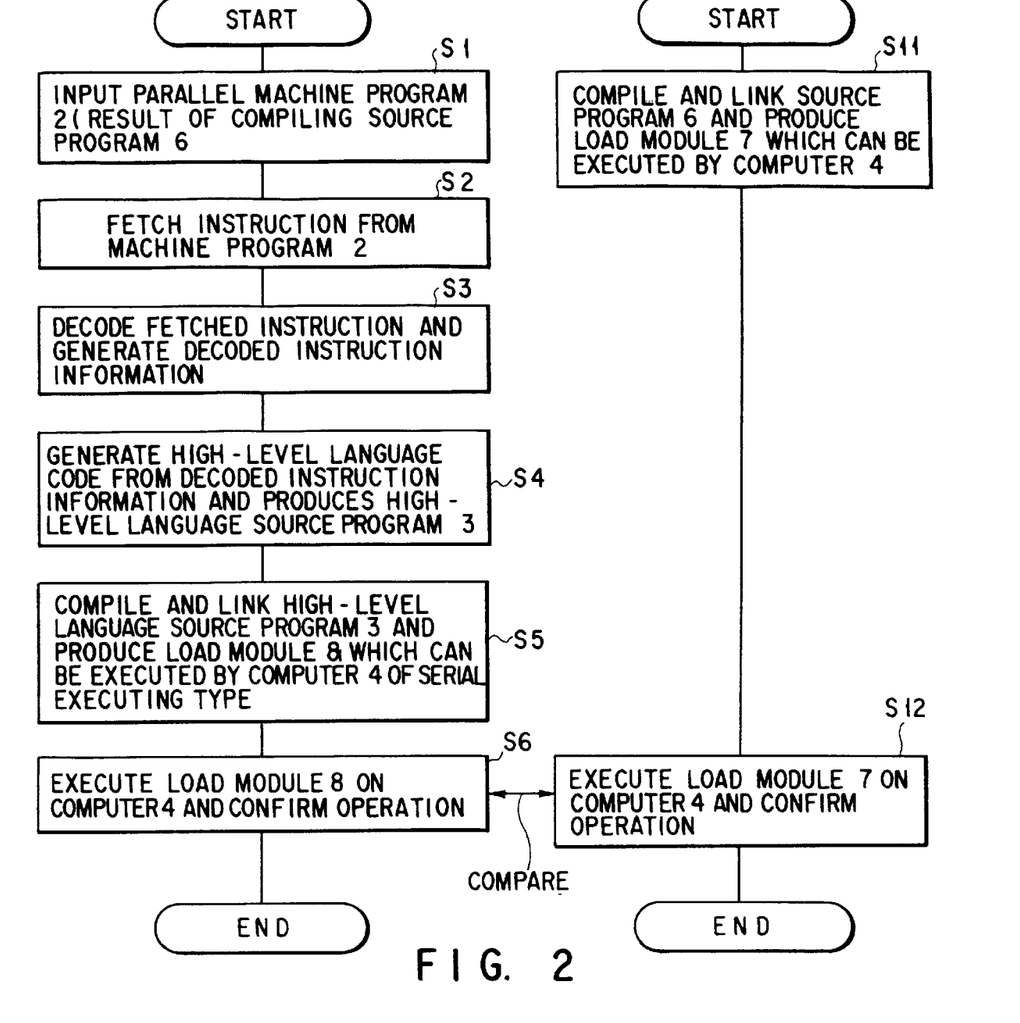
FIG. 2 is a flowchart for explaining procedures for debugging the machine program in the system shown in FIG. 1.

An operation of the above apparatus will now be described with reference to the flowchart shown in FIG. 2.

Figure 3:
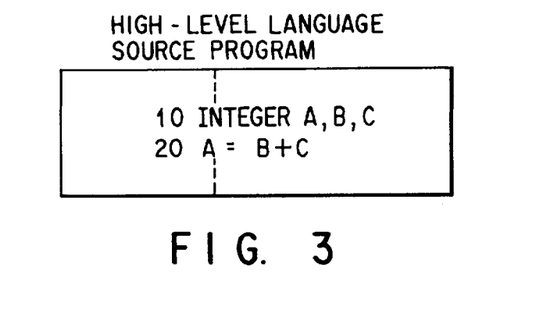
FIG. 3 is a diagram showing an example of a part of a first high-level language source program 6, on which a machine program 2 debugged in the first embodiment is based.
Figure 4:
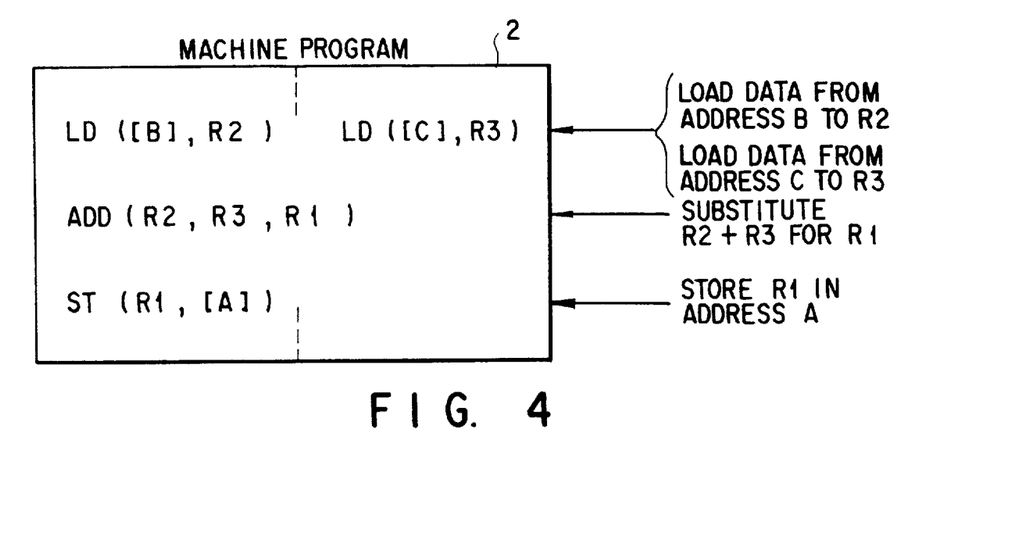
FIG. 4 is a diagram showing the part of the machine program 2 which corresponds to the part of the source program 6 shown in FIG. 3.

The machine program 2 is produced by compiling the first high-level language source program 6 (e.g. FORTRAN) by means of a new compiler 9 adapted for the second architecture for outputting parallel codes. FIG. 3 shows part of an example of the description of the first high-level language source program 6. FIG. 4 shows that part of the machine program 2 which corresponds to the part shown in FIG. 3.

The part of the source program shown in FIG. 3 defines the sum of integer type variables B and C as an integer type variable A. In the part of the machine program shown in FIG. 4, the memory areas of the variables A, B and C are assigned memory addresses A, B and C. In FIG. 4, two instructions LD ([B], R2) and LD ([C], R3) written in one line mean that the instruction of loading data from the address B of the memory to a register R2 and the instruction of loading data from the address C of the memory to a register R3 are executed in parallel.

The machine program 2 is input to the high-level language program producing unit 1 via a main or auxiliary memory device (not shown) (step S1).

The instruction fetch section 11 fetches instructions from the machine program 2 stored in the main or auxiliary memory device. The fetched instructions are copied in the fetched instruction storing section 12 formed in a memory area which is accessible to the decode processing 14 (step S2).

The decode processing section 14 fetches a instruction from the fetched instruction storing section 12 for storing the instructions fetched by the instruction fetch section 11, and decodes it with reference to the. instruction information table 13 (step S3).

An operation of the decode processing section 14 will be described in detail with reference to FIGS. 5 and 6.

Figure 5:
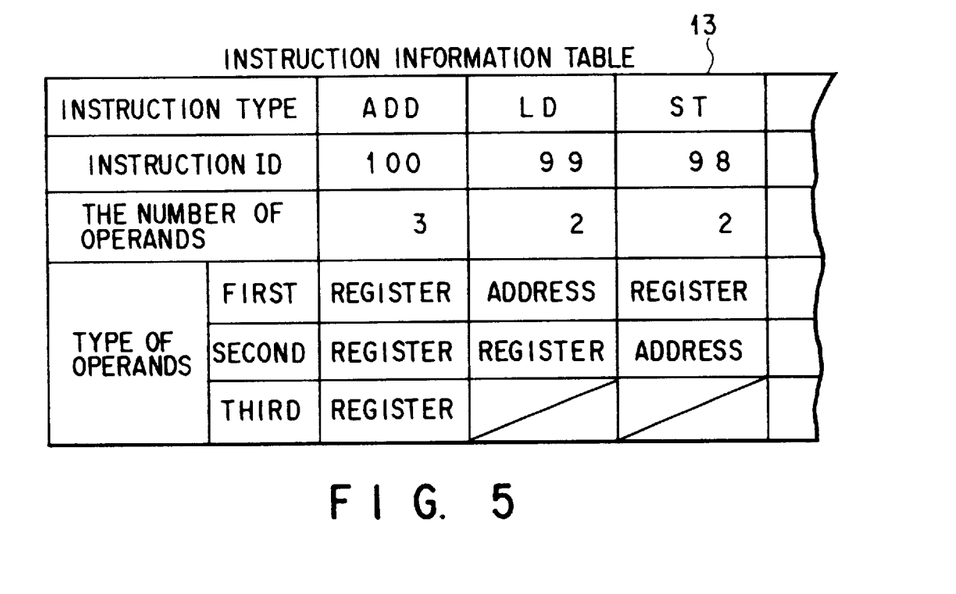
FIG. 5 is a schematic diagram showing examples of the content of a instruction information table 13.

As shown in FIG. 5, the instruction information table 13 has instruction information representing a form of description (notation) corresponding to every type of instruction. In the case of a instruction ADD, instruction information is as follows: a instruction ID (instruction identifier) is "100"; the number of operands is "3"; and the types of first to third operands are all "registers".

The decode processing section 14 reads the type of instruction from the instruction stored in the fetched memory storing section 12, and reads, with reference to the instruction information of the instruction information table 13, the content of the data (e.g., operands or the like) necessary for executing the instruction. For example, when the instruction is LD ([B], R2), the decode processing section 14 reads the type of instruction "LD", a first operand "B" (a first operand value) and a second operand "2" (a second operand register number). That is, the decode processing section 14 reads that the instruction is "to load data from the address B to the register R2".

Figure 6:
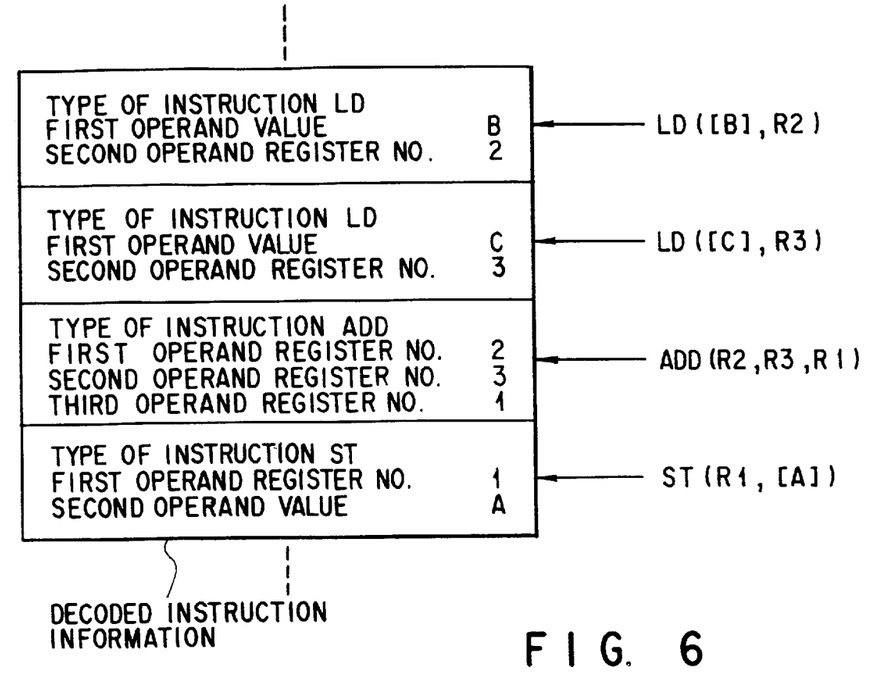
FIG. 6 is a diagram showing decoded instruction information obtained by a decoding process by means of a decode processing unit 14 with respect to the part of the machine program shown in FIG. 4.

The decode processing section 14 generates, from the read information, instruction information (decoded instruction information) of a form which can be processed by the high-level language describing section 16, as shown in FIG. 6. It writes the generated instruction information in the decoded instruction information storing section 15 formed in a memory area which is accessible to the high-level language describing section 16. FIG. 6 shows decoded instruction information obtained by decoding the part of the machine program shown in FIG. 4 by means of the decode processing section 14. As regards instructions on the same line, e.g., the two instructions LD ([B], R2) and LD ([C], R3) shown in FIG. 4, the left instruction is decoded first.

The decoded instruction information stored in the decoded instruction information storing section 15, as a result of the decoding process by means of the decode processing section 14, is input to the high-level language describing section 16. The high-level language describing section 16 generates high-level language codes written in the C language (source codes of the C language), which define the same operation as described by the instruction information, i.e., high-level language codes simulating the instructions described by the instruction information (step S4).

Figure 7:
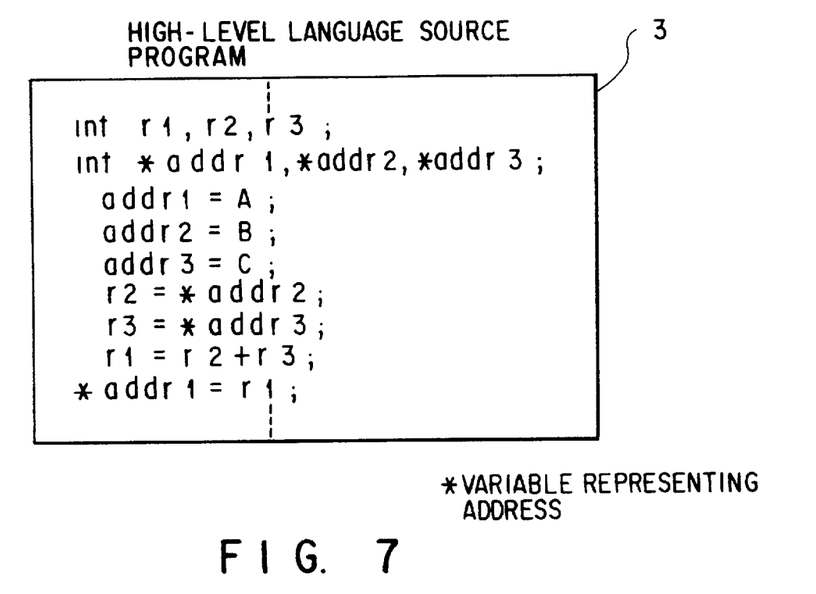
FIG. 7 is a diagram showing the part of a second high-level language source program 3, which corresponds to the part of the machine program shown in FIG. 4, the program 3 being produced from the machine program 2 by means of a high-level language program producing unit 1.

The second high-level language source program 3 written in the C language as shown in FIG. 7 is produced by the high-level language code producing process by means of the high-level language describing section 16. The second high-level language source program 3 is a program which does not basically depend on an architecture. It is produced from the machine program 2, which has been produced by compiling the first high-level language source program 6 for developing a computer of a new architecture (second architecture) with a new compiler (C compiler, in this embodiment), in the direction opposite to that in which the machine program 2 is produced. Therefore, the second high-level language source program 3 is expected to execute the same operation as the machine program 2.

The second high-level language source program 3 generated by the high-level language program producing unit 1, as described above, is compiled and linked by the compiler and linker 5 realized in the (serial executing type) first computer 4, thereby producing the second executable load module 8, which can be executed by the first computer 4 (step S5). When the second executable load module 8 is actually executed in the first computer 4, the expert can confirm the operation of the machine program 2 (step S6). The operation is confirmed on the basis of whether an expected operation (an operation which should be executed, if the machine program 2 is correct) is performed or not.

If an expert who does not accurately understand the expected operation confirms the operation, the following method should be employed.

The first high-level language source program 6, from which the machine program 2 is produced, is compiled and linked by the complier and linker 5, thereby producing a first executable load module 7 which can be executed by the first computer 4 (step S11). The expert actually executes the first executable load module 7 on the first computer 4 (step S12), and comprehends the expected operation. Then, the expert compares the operation in accordance with the first executable load module 7 and the operation in accordance with the second executable load module 8. As a result, he or she can quickly debug the parallel machine program 2 adapted for the new computer.

As described above, according to the present invention, the new compiler (cross FORTRAN compiler) adapted for the second architecture, which produces the machine program 2, can be debugged at a high speed.

The debug object of the present invention is not limited to the FORTRAN compiler but can be applied to debugging of codes of any other compilers, such as a C compiler and a COBOL compiler.

Further, it is possible to read information stored in files or the like in the operations in accordance with the first and second executable load modules 7 and 8, store the read information in a specific memory area, and execute a program for comparing the information stored in the files on the first computer 4, thereby automatically debugging the machine program 2.

In the above embodiment, the debugging can be performed by an existing simulator adapted for the first architecture in place of the first computer 4. In this case, if the simulator corresponds to the machine program depending on the first architecture, it is only necessary to provide the simulator with a machine program produced during a process of compiling the second high-level language source program 3 by means of the compiler and linker 5. If the simulator corresponds to an object, it is only necessary to provide the simulator with an object produced during the compiling process.

In the above embodiment, it is possible to produce a machine program depending on the first architecture from the machine program 2 depending on the second architecture, in the same manner as producing the second high-level language source program 3 by means of the high-level language program producing unit 1, produce from the produced machine program a load module which can be executed by the first computer 4, and debug the machine program 2 based on the load module. It is also possible to debug the machine program by executing it with a simulator adapted for the first architecture.

Figure 8:
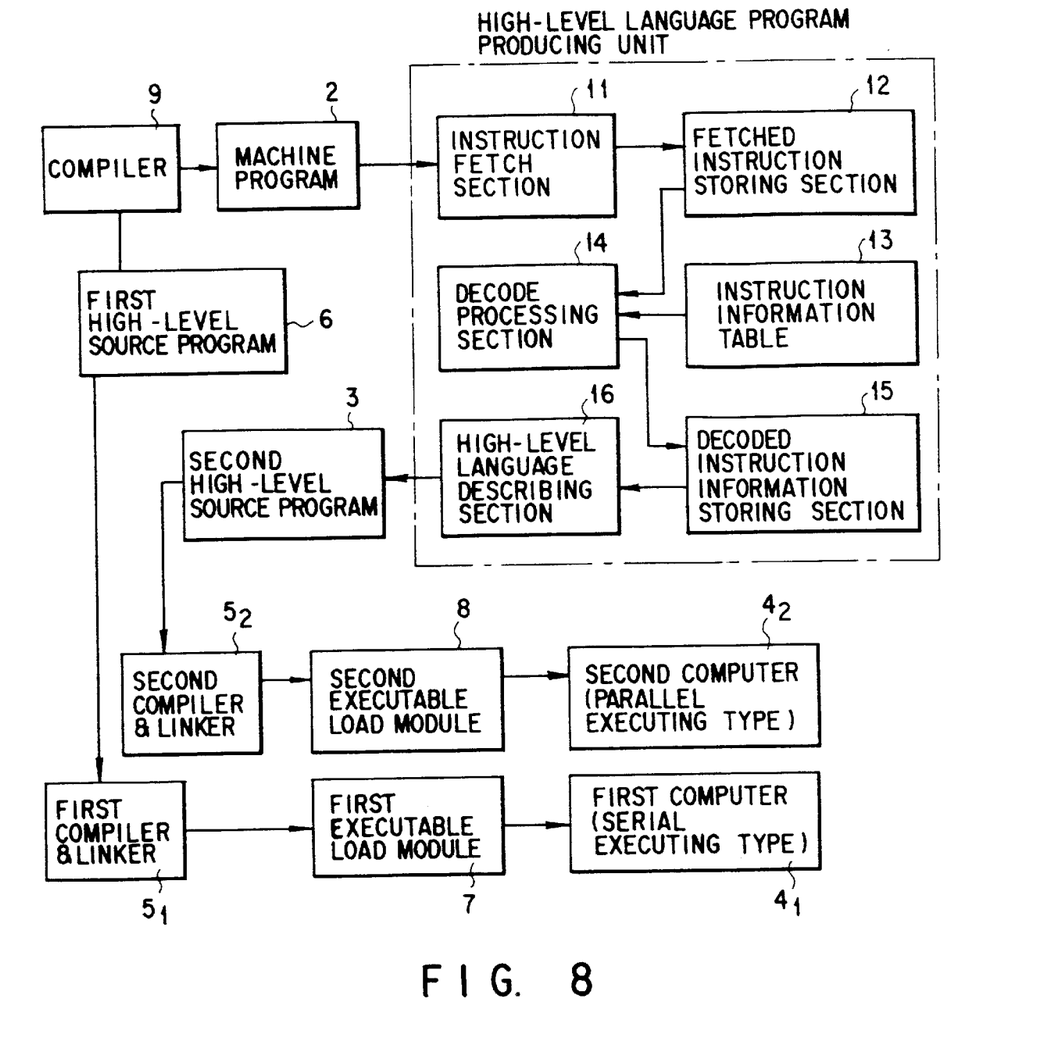
FIG. 8 is a block diagram showing the system of an apparatus for debugging a machine program according to a second embodiment of the present invention.

FIG. 8 is a block diagram showing the system of an apparatus for debugging a machine program according to a second embodiment of the present invention. In FIG. 8, the same components as shown in FIG. 1 are identified with the same numerals as used in FIG. 1, and detailed descriptions thereof are omitted.

The second embodiment differs from the first embodiment in that the compiler and linker 5 is replaced by a first compiler and linker 5₁ and a second compiler and linker 5₂, and the computer 4 is replaced by a first computer 4₁ and a second computer 4₂.

In this embodiment, the first compiler and linker 5₁ produces a first executable load module 7 which can be executed by the first computer 4 1 adapted for the first architecture, and the second compiler and linker 5₂ produces a second executable load module 8 which can be executed by the second computer 4₂ adapted for the second architecture.

In the first embodiment, the first and second high-level language source programs 6 and 3 are executed by the computer of the first architecture to debug the machine program 2. In contrast, in the second embodiment, the first high-level language source program 6 is executed by the first computer and the second high-level language source program 3 is executed by the second computer 4₂ and the results of the execution are compared with each other, thereby debugging the machine program 2. Since detailed operations of the second embodiment are substantially the same as those shown in FIG. 2, a description and a drawing of the operations are omitted.

In the second embodiment also, the machine program can be debugged easily and quickly in the same manner as in the first embodiment.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A converting method for converting an architecture of a program, comprising:

a first step of compiling a first high-level language source program for a computer of a first architecture, thereby producing a machine program for a computer of a second architecture;

a second step of decompiling the machine program, thereby producing a second high-level language source program which does not depend on any architecture; and a third step of compiling and linking the second high-level language source program, thereby producing a first executable load module.

2. A debugging method for debugging the machine program according to claim 1, further comprising a fourth step of executing the first executable load module.

3. The debugging method according to claim 2, further comprising:

a fifth step of compiling and linking the first high-level language source program, thereby producing a second executable load module for the computer of the first architecture;

a sixth step of executing the second executable load module with the computer of the first architecture; and a seventh step of comparing a result of executing the first executable load module in the fourth step with a result of executing the second executable load module in the sixth step.

4. The converting method according to claim 1, wherein the third step includes a step of compiling and linking the second high-level language source program, thereby producing a first executable load module for the computer of the first architecture.

5. The debugging method for debugging the machine program according to claim 4, further comprising a fourth step of executing the first executable load module with the computer of the first architecture.

6. The debugging method according to claim 5, further comprising:

a fifth step of compiling and linking the first high-level language source program, thereby producing a second executable load module for the computer of the first architecture;

a sixth step of executing the second executable load module with the computer of the first architecture; and a seventh step of comparing a result of executing the first executable load module in the fourth step with a result of executing the second executable load module in the sixth step.

7. The converting method according to claim 1, wherein the third step includes a step of compiling and linking the second high-level language source program, thereby producing a first executable load module for the computer of the second architecture.

8. The debugging method for debugging the machine program according to claim 7, further comprising a fourth step of executing the first executable load module with the computer of the second architecture.

9. The debugging method according to claim 8, further comprising:
- a fifth step of compiling and linking the first high-level language source program, thereby producing a second executable load module for the computer of the first architecture;
- a sixth step of executing the second executable load module with the computer of the first architecture; and
- a seventh step of comparing a result of executing the first executable load module in the fourth step with a result of executing the second executable load module in the sixth step.

10. A converting apparatus for converting an architecture of a program, comprising:
- a machine program producing means for compiling a first high-level language source program for a computer of a first architecture, thereby producing a machine program for a computer of a second architecture;
- a second high-level language source program producing means for decompiling the machine program, thereby producing a second high-level language source program which does not depend on any architecture; and
- a first executable load module producing means for compiling and linking the second high-level language source program, thereby producing a first executable load module.

11. A debugging apparatus for debugging the machine program according to claim 10, further comprising a first load module executing means for executing the first executable load module.

12. The debugging apparatus according to claim 11, further comprising:
- a second executable load module producing means for compiling and linking the first high-level language source program, thereby producing a second executable load module for the computer of the first architecture;
- a second executable load module executing means for executing the second executable load module with the computer of the first architecture; and
- a comparing means for comparing a result of executing the first executable load module by means of the first executable load module executing means with a result of executing the second executable load module by means of the second executable load module executing means.

13. The converting apparatus according to claim 10, wherein the first executable load module producing means includes means for compiling and linking the second high-level language source program, thereby producing a first executable load module for the computer of the first architecture.

14. The debugging apparatus for debugging the machine program according to claim 13, further comprising a first executable load module executing means for executing the first executable load module with the computer of the first architecture.

15. The debugging apparatus according to claim 14, further comprising:
- a second executable load module producing means for compiling and linking the first high-level language source program, thereby producing a second executable load module for the computer of the first architecture;
- a second executable load module executing means for executing the second executable load module with the computer of the first architecture; and
- a comparing means for comparing a result of executing the first executable load module by means of the first executable load module executing means with a result of executing the second executable load module by means of the second executable load module executing means.

16. The converting apparatus according to claim 10, wherein the first executable load module producing means includes means for compiling and linking the second high-level language source program, thereby producing a first executable load module for the computer of the second architecture.

17. The debugging apparatus for debugging the machine program according to claim 16, further comprising a first executable load module executing means for executing the first executable load module with the computer of the second architecture.

18. The debugging apparatus according to claim 17, further comprising:
- a second executable load module producing means for compiling and linking the first high-level language source program, thereby producing a second executable load module for the computer of the first architecture;
- a second executable load module executing means for executing the second executable load module with the computer of the first architecture; and
- a comparing means for comparing a result of executing the first executable load module by means of the first executable load module executing means with a result of executing the second executable load module by means of the second executable load module executing means.

* * * * *